US009047308B2

(12) United States Patent
Bickle et al.

(10) Patent No.: US 9,047,308 B2
(45) Date of Patent: Jun. 2, 2015

(54) METHODS AND APPARATUS FOR PROVIDING UNIFIED ACCESS TO VARIOUS DATA RESOURCES USING VIRTUALIZED SERVICES

(71) Applicant: Kinvey, Inc., Boston, MA (US)

(72) Inventors: Morgan R. Bickle, Melrose, MA (US);
Brian A. Wilson, Boston, MA (US);
Ivan D. Stoyanov, Brookline, MA (US);
Sravish Sridhar, Cambridge, MA (US)

(73) Assignee: Kinvey, Inc., Boston, MA (US)

( * ) Notice: Subject to any disclaimer, the term of this patent is extended or adjusted under 35 U.S.C. 154(b) by 0 days.

(21) Appl. No.: 13/917,084

(22) Filed: Jun. 13, 2013

(65) Prior Publication Data

US 2014/0025695 A1 Jan. 23, 2014

Related U.S. Application Data

(60) Provisional application No. 61/673,490, filed on Jul. 19, 2012.

(51) Int. Cl.
*G06F 17/30* (2006.01)

(52) U.S. Cl.
CPC .... *G06F 17/30194* (2013.01); *G06F 17/30893* (2013.01)

(58) Field of Classification Search
USPC ................................. 707/756, 760
See application file for complete search history.

(56) References Cited

U.S. PATENT DOCUMENTS

| 8,346,932 B1* | 1/2013 | Holland et al. ............... 709/226 |
| 8,739,282 B1 | 5/2014 | Jayaraman et al. |
| 2006/0112398 A1* | 5/2006 | Mukkamala et al. ......... 719/316 |
| 2007/0118560 A1* | 5/2007 | Bornhoevd et al. ........ 707/104.1 |
| 2008/0005086 A1* | 1/2008 | Moore .............................. 707/3 |
| 2009/0182565 A1* | 7/2009 | Erickson et al. .................. 705/1 |
| 2012/0233595 A1* | 9/2012 | Ghanathe et al. ............. 717/123 |
| 2013/0019018 A1* | 1/2013 | Rice ............................. 709/226 |

* cited by examiner

*Primary Examiner* — Shyue Jiunn Hwa
(74) *Attorney, Agent, or Firm* — Cooley LLP (57) ABSTRACT

A non-transitory processor-readable medium stores code representing instructions to be executed by a processor. The code causes the processor to receive, from a client device, a request for a service associated with a set of compute devices. The processor is caused to define a normalized request, based on a metadata associated with service requirements. The processor is caused to define a translated request for a compute device from the set of compute devices based on the normalized request. The processor is caused to send the translated request to the compute device in accordance with an endpoint interface associated with a format of the translated request. The processor is caused to receive data associated with the service from the compute device, in response to the translated request. The processor is caused to send, to the client device, a response having a format associated with the client device based on the data.

20 Claims, 8 Drawing Sheets

METHODS AND APPARATUS FOR PROVIDING UNIFIED ACCESS TO VARIOUS DATA RESOURCES USING VIRTUALIZED SERVICES

CROSS-REFERENCE TO RELATED APPLICATIONS

This application claims priority to U.S. Provisional Patent Application No. 61/673,490, filed on Jul. 19, 2012, entitled "Federated Data Access from Various Mobile and Web Client Platforms using a Virtualized Web Service", which is incorporated herein by reference in its entirety.

BACKGROUND

Some embodiments described herein relate generally to methods and apparatus for resource management by providing abstraction layers to services that expose a unified application programming interface (API) and can be configured dynamically.

The use and popularity of mobile devices continues to increase. In mobile communication environments, value of access to information has increased as users have become more dependent on accessing information on the go from both mobile devices and other network-connected devices. Mobile and network development is complicated by the mixing of public data and private data with the plethora of popular public media content services and proprietary security-sensitive data. Another challenge is making the data available to an application and avoiding proprietary and fragmented Application Programming Interfaces (APIs) that complicate the application code running on the devices. Another side effect of depending directly on a proprietary API is keeping up with breaking API version changes. In addition to the proprietary API challenge, considerations exist because many of the API providers charge per API call and freely change their pricing structure.

Therefore, a need exists for an approach to provide resource management by abstraction of multiple competing services to allow users to switch between various services without the need to change related applications or for new versions of the services to be released.

SUMMARY

In some embodiments, a non-transitory processor-readable medium stores code representing instructions to be executed by a processor, the code comprising code to cause the processor to receive, from a client device having a data library, a request for a service associated with a set of compute devices. Each compute device has an endpoint interface for the service. The processor is also caused to define a normalized request, in response to the request, based on a metadata associated with one or more service requirements for the service. The processor is further caused to define a translated request for a compute device from the set of compute devices based on the normalized request. The translated request has a format associated with the endpoint interface for that compute device. The processor is also caused to send the translated request to the compute device in accordance with the endpoint interface associated with the format of the translated request. The processor is also caused to receive data associated with the service from the compute device via the endpoint interface, in response to the translated request. The processor is also caused to send, to the client device, a response having a format associated with the client device based on the data.

DETAILED DESCRIPTION

Methods and apparatus are described herein, for example, to provide resource management via abstraction of services to allow users to switch between various services without the need to change related applications or for new versions of the service to be released. In some embodiments, a non-transitory processor-readable medium stores code representing instructions to be executed by a processor, the code comprising code to cause the processor to receive, from a client device having a data library, a request for a service associated with a set of compute devices. Each compute device has an endpoint interface for the service. The processor is also caused to define a normalized request, in response to the request, based on a metadata associated with one or more service requirements for the service. The processor is further caused to define a translated request for a compute device from the set of compute devices based on the normalized request. The translated request has a format associated with the endpoint interface for that compute device. The processor is also caused to send the translated request to the compute device in accordance with the endpoint interface associated with the format of the translated request. The processor is also caused to receive data associated with the service from the compute device via the endpoint interface, in response to the translated request. The processor is also caused to send, to the client device, a response having a format associated with the client device based on the data.

In some embodiments, a normalization module is configured to receive a request for a service from a client device having a set of data libraries. The service is associated with a compute device having an endpoint interface for the service. The normalization module is configured to receive at least one metadata associated with one or more service requirements for the service. The normalization module is configured to define a normalized request in response to the request, based on the metadata. A virtualization module is configured to define a translated request for the compute device based on the normalized request. The translated request has a format associated with the endpoint interface for the compute device.

The virtualization module is configured to send the translated request to the compute device in accordance with the endpoint interface associated with the format of the translated request. A data integration module is configured to receive data associated with the service from the compute device via the endpoint interface. The data integration module configured to define a response having a format associated with the client device based on the data. The data integration module configured to send the response to the client device.

In some embodiments, a non-transitory processor-readable medium stores code representing instructions to be executed by a processor, the code comprising code to cause the processor to receive, from a client device having a data library, a request for a service associated with a set of compute devices. Each compute device has an endpoint interface for the service. The processor is also caused to receive, from a customization device, a request-customization code associated with the request based on one or more service requirements for the service and the request. The processor is also caused to define a normalized request, in response to the request, based on the request-customization code. The processor is also caused to define a translated request for a compute device from the set of compute devices based on the normalized request. The translated request has a format associated with the endpoint interface for that compute device. The processor is also caused to send the translated request to the compute device in accordance with the endpoint interface associated with the format of the translated request. The processor is also caused to receive data associated with the service from the compute device via the endpoint interface, in response to the translated request. The processor is also caused to define a response having a format associated with the request-customization code based on the data. The processor is also caused to send, to the client device, the response having a format associated with the request-customization code based on the data.

As used herein, the singular forms "a," "an" and "the" include plural referents unless the context clearly dictates otherwise. Thus, for example, the term "a "resource" is intended to mean a single resource or a combination of resources (e.g., data sets, data bases, files, data warehouses, etc. provided by different service provider compute devices 109 of FIG. 1).

As used herein, a platform can include, for example, a hardware architecture and a software framework (including application frameworks), where the combination allows software to be executed. A platform can include multiple components or modules. As used herein, a module can be, for example, any assembly and/or set of operatively-coupled electrical components, and can include, for example, a memory, a processor, electrical traces, optical connectors, software (executing or to be executed in hardware) and/or the like.

Figure 1:
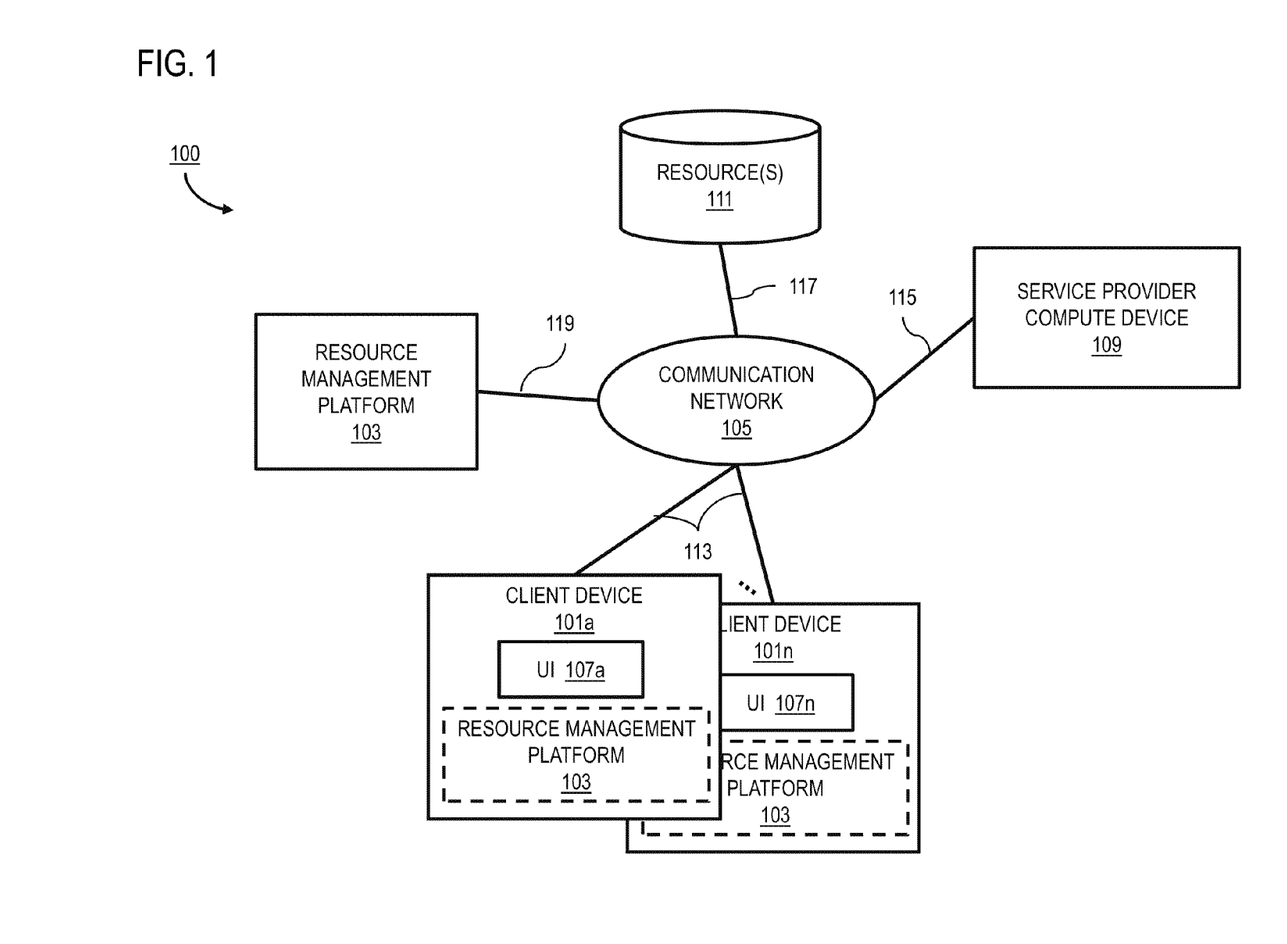
FIG. 1 is a schematic block diagram of a computer system configured to provide resource management, according to an embodiment.

FIG. 1 is a schematic block diagram of a computer system configured to provide resource management, according to an embodiment. The computer system 100 includes at least one client device 101a-101n having at least a User Interface (UI) 107a-107n. The computer system 100 also includes a resource management platform 103, at least one service provider compute device 109, and at least one resource 111. A service provider compute device 109 can be operatively coupled to one or more client devices 101a-101n, one or more resource(s) 111, and/or other service provider compute devices 109 via a communication network 105. Note that the resource management platform 103 or some of its components can be embedded within the client device 101a-101n, embedded within a service provider compute device 109, and/or be external to the client device 101a-101n, and the service provider compute device 109. In addition, the resource management platform 103 can be operatively coupled to one or more client devices 101a-101n, one or more service provider compute devices 109, or one or more resource 111 via a communication network 105. Any of the devices or platforms of the computer system 100 can be equipped with local memory/storage spaces and/or processors (not shown in FIG. 1). Furthermore, the devices and platforms of the computer system 100 can have access to centralized or distributed memory/storage spaces and/or processors (not shown in FIG. 1) through the communication network 105. Thus, FIG. 1 is merely an example illustrating the types of devices and platforms that can be included within a computer system 100.

Communication network 105 can be any communication network, such as the Internet, configurable to allow the client device 101a-101n, the resource management platform 103, and the service provider compute device 109 to communicate with communication network 105 and/or to each other and to access the resource 111. Communication network 105 can be any network or combination of networks capable of transmitting information (e.g., data and/or signals) and can include, for example, a telephone network, an Ethernet network, a fiber-optic network, a wireless network, and/or a cellular network.

In some instances, communication network 105 can include multiple networks operatively coupled to one another by, for example, network bridges, routers, switches and/or gateways. For example, the client device 101a-101n and/or the resource 111 can be operatively coupled to a cellular network; the service provider compute device 109 and/or the resource management platform 103 can be operatively coupled to a fiber-optic network. The cellular network and fiber-optic network can each be operatively coupled to one another via one or more network bridges, routers, switches, and/or gateways such that the cellular network, the Ethernet network and the fiber-optic network are operatively coupled to form a communication network. Alternatively, the cellular network and fiber-optic network can each be operatively coupled to one another via one or more additional networks. For example, the cellular network and the fiber-optic network can each be operatively coupled to the Internet such that the cellular network, the fiber-optic network and the Internet are operatively coupled to form a communication network.

As illustrated in FIG. 1, the client device 101a-101n is operatively coupled to communication network 105 via network connection(s) 113; service provider compute device 109 is operatively coupled to communication network 105 via network connection(s) 115; and the resource management platform 103 is operatively coupled to communication network 105 via network connection(s) 119. Furthermore, resource(s) 111 can be operatively coupled to or accessed via the communication network 105 via network connection(s) 117. Network connections 113, 115, 117 and 119 can be any appropriate network connection for operatively coupling client device 101a-101n, service provider compute device 109, and the resource management platform 103, respectively. In addition, a resource 111 can be directly coupled to (e.g., not via communication network 105) a client device 101a-101n or to a service provider compute device 109 (direct connection(s) not shown in FIG. 1).

A network connection can be a wireless network connection such as, for example, a wireless fidelity ("Wi-Fi") or Wireless Local Area Network ("WLAN") connection, a Wireless Wide Area Network ("WWAN") connection, and/or a cellular connection. A network connection can be a wired connection such as, for example, an Ethernet connection, a Digital Subscription Line ("DSL") connection, a broadband coaxial connection, and/or a fiber-optic connection.

As mentioned above, in some instances, a computer system 100 can include more than one client device 101a-101n, more than one resource management platform 103, more than one service provider compute device 109, and more than one resource 111. A client device 101a-101n, a resource management platform 103, a service provider compute device 109 and/or a resource 111, can be operatively coupled to the communication network 105 by heterogeneous network connections. For example, a first client device 101a-101n can be operatively coupled to the communication network 105 by a WWAN network connection, another client device 101a-101n can be operatively coupled to the communication network 105 by a DSL network connection, and a resource management platform 103 can be operatively coupled to the communication network 105 by a fiber-optic network connection. The service provider compute device 109 can be, for example, a web server configured to provide various applications to electronic devices, such as client device 101a-101n.

The client device 101a-101n can be any of a variety of electronic devices that can be operatively coupled to communication network 105. A client device 101a-101n can be a personal computer, a tablet computer, a personal digital assistant (PDA), a cellular telephone, a portable/mobile internet device and/or some other electronic communication device. The client device 101a-101n can include a web browser configured to access a service (e.g., a webpage or website) hosted on or accessible via the service provider compute device 109 over communication network 105. The client device 101a-101n can be configured to support, for example, HTML using JavaScript. For example, the client device 101a-101n can include a web browser, such as, Internet Explorer®, Firefox®, Safari®, Dolphin®, Opera® and Chrome®, etc. An Internet page or website can be accessed by a user of a web browser at a client device 101a-101n by providing the web browser with a reference such as a uniform resource locator (URL), for example, of a webpage.

A resource 111 can be an application, data associated with the application, etc. stored in a memory location and a service provider compute device 109 can be a web server storing, configuring and providing resource(s) 111 to client devices 101a-101n. For example, the resource(s) 111 can be texts, photos, videos, music, etc. In some instances, a user of a client device 101a-101n can access a resource 111 provided by a service provider compute device 109, via a URL designated for the service provider compute device 109. The client device 101a-101n can access a resource 111 provided by the service provider compute device 109 via the URL. In some instances, a client device 101a-101n can include specialized software for accessing a service provided by a service provider compute device 109 using a web server other than a browser, such as, for example, a specialized network-enabled application or program. In some instances, portions of a resource 111 accessible via a resource management platform 103 can be located in a local or remote memory space/data store accessible to the resource management platform 103. Such data store can be at least one of a database, a data warehouse, or a file. A client device 101a-101n can also include a display, monitor or user interface (UI) 107, a keyboard, various ports (e.g., a Universal Serial Bus (USB) port), and other user interface components, such as, for example, digital pens, mice, touch screen controls, audio components, and/or video components (each not shown). A client device 101a-101n can be operatively coupled to communication network 105 via the UI 107 and network connection 113.

In some instances, the resource management platform 103 provides synchronizing, managing, tracking, transforming and filtering of resource(s) 111 to be provided to a user of a client device 101a-101n by service provider compute devices 109. The resource(s) 111 can be provided by a service provider compute device 109 to multiple client devices 101a-101n by way of a unified interface over a web service protocol backed by sources such as a database, web cache, online content provider, etc.

In some instances, a client device 101a-101n can includes a set of client data libraries (not shown in FIG. 1) for various services provided by service provider compute devices 111. The resource management platform 103 can receive requests from a client device 101a-101n and map the request to a service provider compute device 109 by way of a virtual service dispatcher or hosted services based on a nature of the request and service mapping.

In some instances, the resource management platform 103 can define virtual services as a collection of endpoint interfaces or Application Programming Interfaces (APIs) based on services provided by one or more service provider compute device(s) 109. Each service provider compute device 109 can be associated with an API for a service provided by the service provider compute device 109. In some instances, APIs can be provided through a service mediation device (not shown in FIG. 1). The resource management platform 103 can provision a service provider compute device 109 and dynamically configure services that can be available to the client device 101a-101n.

In some instances, the resource management platform 103 can provide access to a service provider compute device 109 as a "backend as a service" platform. This enables a user of client device 101a-101n to setup and operate access to services provided by service provider compute devices 109 for mobile, tablet and/or web applications. The user can use the client data libraries to get access to one or more resource(s) 111 including, for example, at least one of a REST-based application service, a file storage service, a push notification service, a geo-location service, a mobile analytic service, a user management service, a data-level privacy service, a security access control service, etc.

In some instances, the computer system 100 can be implemented in a cloud-based architecture. For example, the resource management platform 103, the service provider compute device 109 and/or the resource(s) 111 can be associated with a shared pool of configurable computing resources (e.g., networks, network bandwidth, servers, processing, memory, storage, applications, virtual machines services, etc.) that can be rapidly provisioned and released with minimal management effort or interaction with a provider of the service. Moreover, service models that can be leveraged in whole or in part include, for example, Software as a Service (SaaS), where applications associated the service provider compute device 109 run on cloud infrastructure; Platform as a Service (PaaS), where the client device 101a-101n can deploy applications that may be defined by the service provider compute device 109 onto the cloud infrastructure; Infrastructure as a Service (IaaS), where the client device 101a-101n can provision its own processing, storage, networks and other computing resources and can deploy and run operating systems and applications.

The computer system 100 can include co-located hardware and software resource(s) 111, or resources that are physically, logically, virtually and/or geographically distinct. Furthermore, the communication network 105 can be packet-based, non-packet based, secure, non-secure, or combinations thereof.

Figure 2:
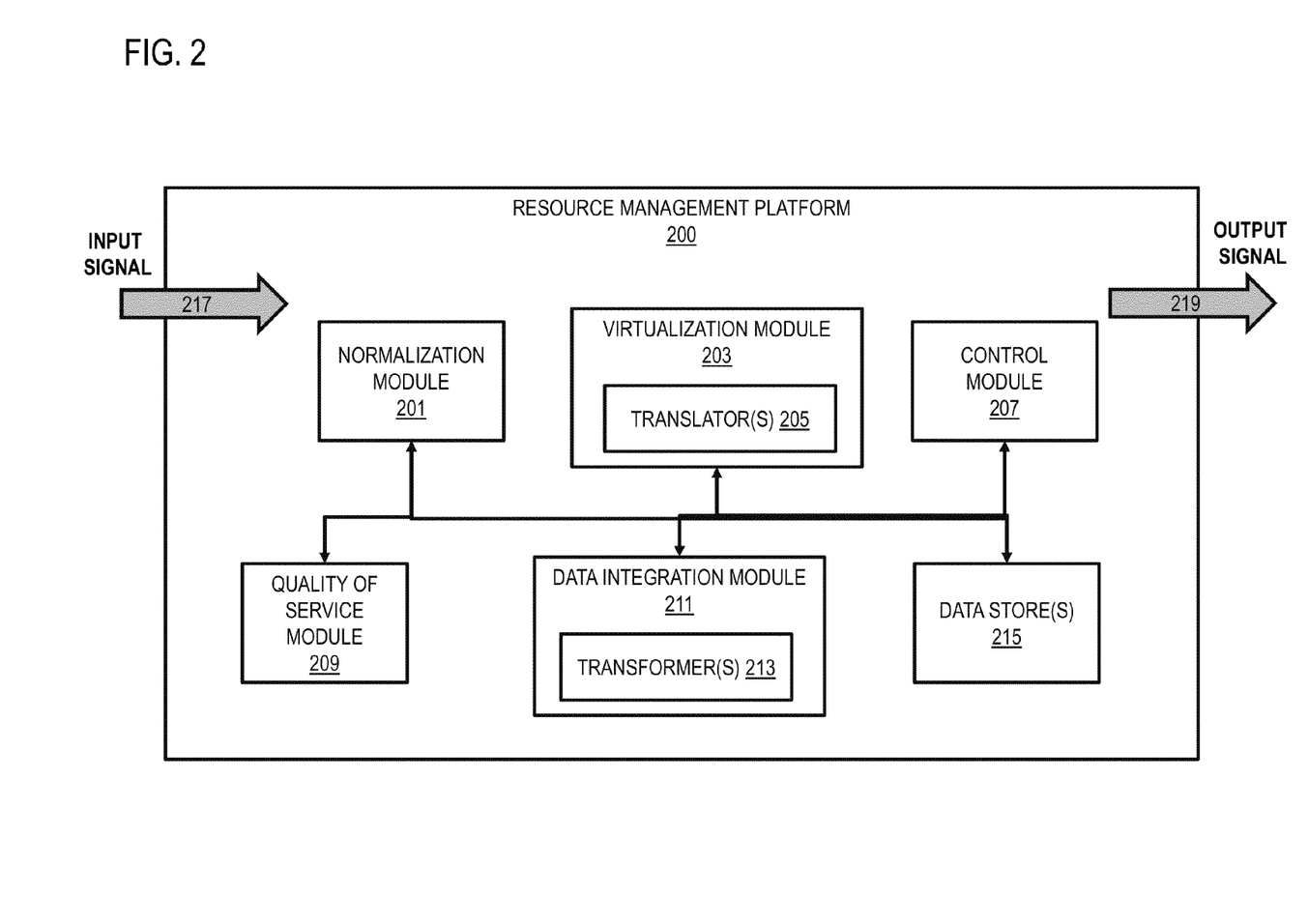
FIG. 2 is a schematic illustration of a resource management platform, according to an embodiment.

FIG. 2 is a schematic illustration of a resource management platform, according to an embodiment. Resource management platform 200 of FIG. 2 can be similar to the resource management platform 103 of FIG. 1. As shown in FIG. 2, a resource management platform 200 can include a normalization module 201, a virtualization module 203, a control module 207, a quality of service module 209, a data integration module 211, and a data store 215. Moreover, the virtualization module 203 can include at least one transformer 205, and the data integration module 211 can include at least one transformer 213. Furthermore, the resource management platform 200 can communicate with other components of a computer system (e.g., computer system 100 of FIG. 1) via input signal 217 and output signal 219, which are received and sent respectively through an input port and an output port (not shown in FIG. 2). Each module can be capable of performing one or more specific functions associated with the resource management platform 200, as discussed further below. The resource management platform 200 can provide management of at least one resource 111 for a client device 101a-101n with a UI 107a-107n.

In various instances, the resource management platform 200 and its components may be located anywhere within a computer system 100 such as that shown in FIG. 1 including, but not limited to, within the client device 101a-101n, within the service provider compute device 109, or in separate locations within the computer system 100 of FIG. 1. In some instances, the normalization module 201 can receive a request for a service from a client device 101a-101n of FIG. 1, via an input signal 217. The request for service can be a request for a service provided by one or more service provider compute devices 109 of FIG. 1. The normalization module 201 can normalize the request by, for example, removing redundant and/or platform-specific data (e.g., data specific to the client device 101a-101n that the request is originated from, data specific to a specific service provider compute device 109, etc.). The normalization module 201 can store the normalized request in data store 215.

In some instances, the virtualization module 203 can define a translated request from the normalized request. The virtualization module 203 can have one or more translator(s) 205 to translate the normalized request provided by the normalization module 201 for a service provider compute device 109 such that the translated request has a format suitable for an API of the service provider compute device 109.

In some instances, each translator 205 can be uniquely associated with a service provided by a service provider compute device 109. In such instances, the control module 207 can activate a translator 205 based on the requested service. For example, a translator T1 can be associated with a service S1 and a translator T2 different from translator T1 can be associated with a service S2 different from service S1. In this example, if the client device 101a-101n requests a service S1, the control module 207 activates translator T1. Similarly, translator T2 is activated if the requested service is service S2. The translated request can be sent by the resource management platform 200 to a service provider compute device 109 via an output signal 219. In some instances, the control module 207 can switch between translators from the set of translators 205 without a need for reconfiguration or changing of the client data libraries associated with the client device 101a-101n. For example, a user of a client device 101a-101n will not have to update the client data libraries or download new client data libraries to be able to access new services provided by service provider compute devices 109.

In some instances, the control module 207 can switch automatically between translators from the set of translators 205, using metadata associated with the data in client data libraries. Metadata refers to data about data. For example, a request received from a client device 101a-101n can be associated with metadata such as, for example, request date, request time, location of the client device 101a-101n at the time of request, etc. The metadata can also include service requirements with regards to a service provider compute device 109 such as, for example, a network host, a port, Hypertext Transfer Protocol (HTTP) properties, socket based properties, etc., as well as authentication metadata used for transmission of request to the service provider compute device 109.

In some instances, the control module 207 can select a translator, for example, based on a time of the request, an availability of the requested service, based on preference data of a user of the client device 101a-101n, etc. For example, a client device 101a-101n can have an associated priority of service during certain hours during the day. In such cases, the control module 207 can switch between translators 205 to direct the request to a service provider compute device 109 that is available during those hours.

In some instances, the resource management platform 200 can provide an administrative interface configured to receive configuration data associated with a new translator 205. The virtualization module 203 can use the configuration data to define the new translator. For example, the new translator can be associated with a new service provider compute device 109. The resource management platform 200 can include a component such as, for example, a code generator (not shown) to define the new translator.

In some instances, the resource management platform 200 receives a response to the translated request from the service provider compute device 109 via an input signal 217. In such instances, the quality of service module 209 can evaluate a quality-of-service (QoS) value for the response based on a client data library associated with the client device 101a-101n that initiated the request, based on metadata associated with the client device 101a-101n, based on a user account associated with the client device 101a-101n, etc.

In some instances, the control module 207 can define whether the response is being sent to the client device 101a-101n based on the calculated value of the QoS. For example, if the value of QoS is lower than a predefined threshold, the control module 207 can prevent the response from being sent to the client device 101a-101n. The control module 207 can send a message to the client device 101a-101n indicating that the response is not satisfactory. The control module 207 can send a signal to the virtualization module 203 to translate the normalized query using a different translator 205 associated with a different service provider compute device 109, for example, based on an instruction from a user of the client device 101a-101n.

In some instances, if the QoS value is higher than the predefined threshold, the data integration module 211 can transform the response to a transformed response, using a transformer 213, to a format associated with the client device 101a-101n. The resource management platform 200 can send the transformed response to the client device 101a-101n via an output signal 219.

In some instances, a user priority is defined for each user account from multiple user accounts associated with a client device 101a-101n. The user priority can be defined based on the QoS value for each client device 101a-101n. In such instances, the virtualization module 203 can send the translated request to a service provider compute device 109 based on the user priority for the user account associated with the client device 101a-101n. For example, service requests from users with higher priorities can be sent to the service provider compute device 109 before service requests from users with lower priorities.

In some instances, the resource management platform 200 can provide access to the client device 101a-101n, to service provider compute devices 109 providing various services such as, for example, a REST-based application service, a file storage service, a push notification service, a geo-location service, a mobile analytic service, a user management service, a data-level privacy service, a security access control service, etc.

Figure 3:
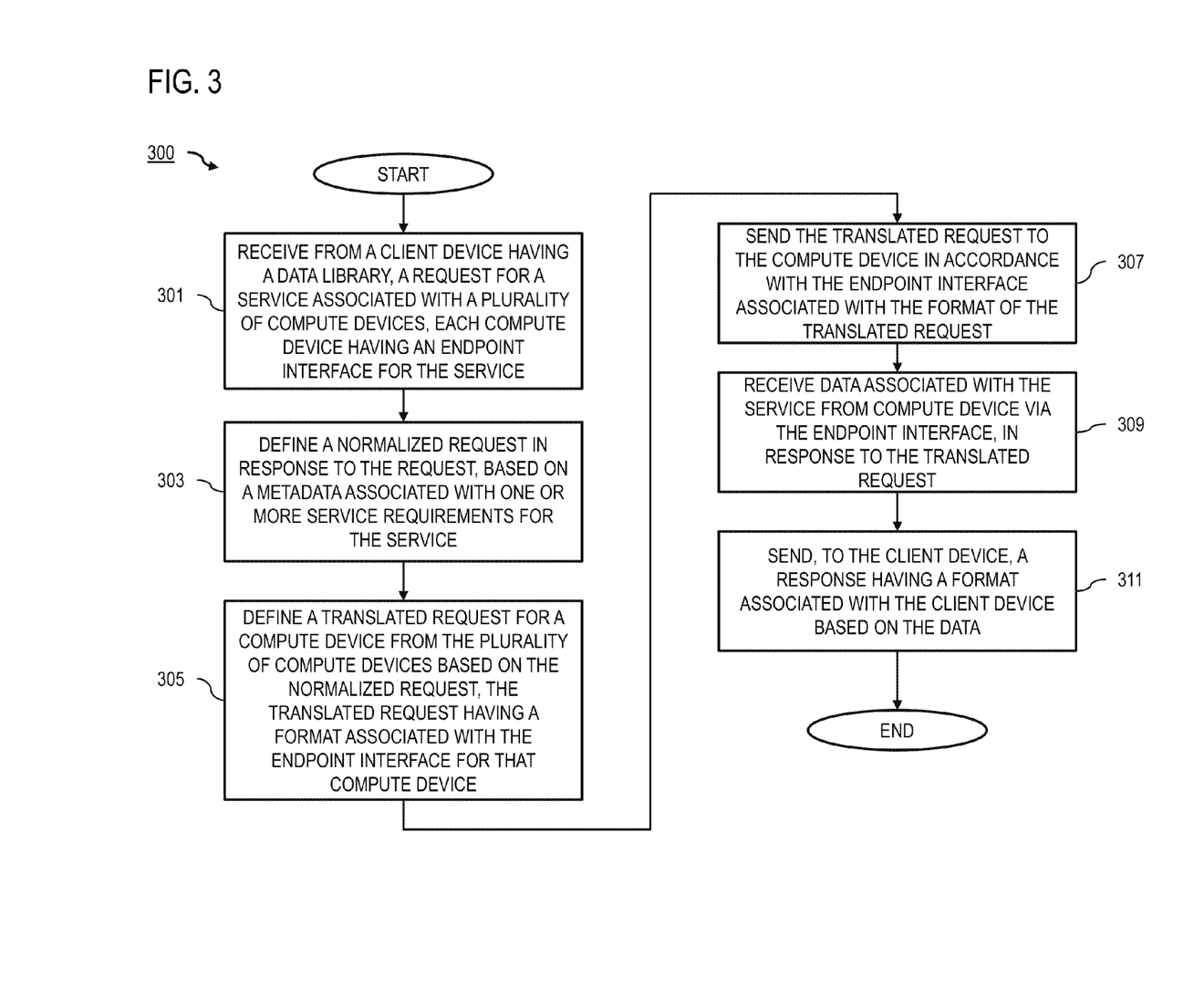
FIG. 3 is a flowchart of a process for providing resource management, according to an embodiment.

FIG. 3 is a flowchart of a process for providing resource management, according to an embodiment. At 301, a request for a service is received from a client device (e.g., 101a-101n shown in FIG. 1) at a resource management platform (e.g., 200 shown in FIG. 2). The requested service can, for example, be an online accessible service, a legacy enterprise service, etc., provided by one or more service provider compute devices 109 (as shown in FIG. 1).

In some instances, each client device 101a-101n can be associated with at least one client data library that enables the client device 101a-101n to define a request for the service. For example, the at least one client data library can be used for defining an Input/Output (I/O) request to the resource management platform 200. The resource management platform 200 can examine availability of the service provider compute devices 109, for example, based on a dynamically-configurable set of metrics to select a service provider compute device 109 to which to forward the request. The set of metrics can be from different categories such as, for example, cost, client device sensor data, service provider compute device availability, service provider compute device performance, etc.

In some instances, the resource management platform 200 can monitor and manage request routes (e.g., the service provider compute devices to which a request can be sent) based on resource availability, load of each service provider compute device 109, responsiveness of each service provider compute device 109, rate limits of each service provider compute device 109, etc. The resource management platform 200 can manage resources and route requests, for example, based on cloud scaling and partitioning algorithm to scale different parts based on pre-defined rules, peak traffic triggers, time-based analysis, dynamic cluster re-configuration, storing and routing of data associated with requests and responses to specific data stores (e.g., data stores 215) based on pre-defined rules, etc.

In some instances, each service provider compute device 109 can have an endpoint interface that provides an API for the service. For example, the resource management platform 200 can enable integration among service provider compute devices 109. Service provider compute device 109 can include public APIs for public services such as, for example, Google® Places, Yahoo!® Local, etc. Additionally/alternatively, a service provider compute device 109 can provide private services hosted on a customer's own services. The resource management platform 200 simplifies accessing these services using a standard API for each class/type of service. Each service provider API can be exposed through a service provider endpoint interface (not shown) such that the APIs can be accessible, for example, through a Representational State Transfer (REST)-based application data store and/or the client data libraries of the client device 101a-101n.

At 303, a normalized request is defined, in response to the request, for example, by a normalization module (e.g., 201 shown in FIG. 2). The normalized request can be defined based on a metadata associated with one or more service requirements for the service. The metadata, as previously discussed, can include service requirements with regards to a service provider compute device 109 such as, for example, a network host, a port, Hypertext Transfer Protocol (HTTP) properties, socket based properties, etc., as well as authentication metadata used for transmission of request to the service provider compute device 109.

At 305, a translated request is defined, based on the normalized request, for a service provider compute device from the one or more service provider compute devices (e.g., 109 shown in FIG. 1). The translated request can have a format associated with the endpoint interface for that service provider compute device 109. The translated request can be defined, for example, by a translator 205 from the virtualization module 203. In some instances, the translator 205 can define the translated request through a service mediation layer (not shown). The service mediation layer can be, for example, a device mediating between the resource management platform 103 and the service provider compute device 109. In some instances, the translated request can be defined based on preference data associated with the client device (e.g., 101a-101n shown in FIG. 1). For example, a user of the client device can define preferences associated with the service or the service provider compute devices 109. The preferences can be stored on a local memory on the client device 101a-101n (not shown), on data store(s) 215, or in a separate location throughout the communication network 105.

At 307, the translated request can be sent to the service provider compute device (e.g., 109 shown in FIG. 1) via an output signal (e.g., 219 shown in FIG. 2) from the resource management platform (200). The translated request can be sent to the service provider compute device (109) in accordance with the endpoint interface of the service provider compute device (109) that is associated with the format of the translated request.

At 309, data associated with the service is received from the service provider compute device (109) via the endpoint interface and an input signal (217) at the resource management platform (200), in response to the translated request. In some instances, the data integration module (e.g., 211 shown in FIG. 2) transforms the received data, for example using a transformer (213), to a format compatible with the client device (101a-101n).

At 311, a response provided by a data integration module (211) based on the data received from the service provider compute device (109), is sent from the resource management platform (200) to the client device (101a-101n). The response has a format associated or compatible with the client device (101a-101n) based on the data. In some instances, the data integration module 211 provides the response based on a client data library of the client device 101a-101n associated with the service. Note that, the client device can have multiple client data libraries associated with various services. In such instances, the data integration module 211 can define the response based on the received data and the client data library of the client device that is associated with the service without reconfiguring or changing other client data libraries of the client device 101a-101n.

In some instances, the client device 101a-101n can be associated with a network external from the network with which the service provider compute device 109 is associated. In such instances, the resource management platform 103 can translate the request based on configurations and characteristics associated with the service provider compute device 109 network before sending the translated request to the service provider compute device 109. The resource management platform 103 can also transform the data associated with the service received from the service provider compute device 109 based on configurations and characteristics associated with the client device 101a-101n network before sending the response to the client device 101a-101n.

Figure 4:
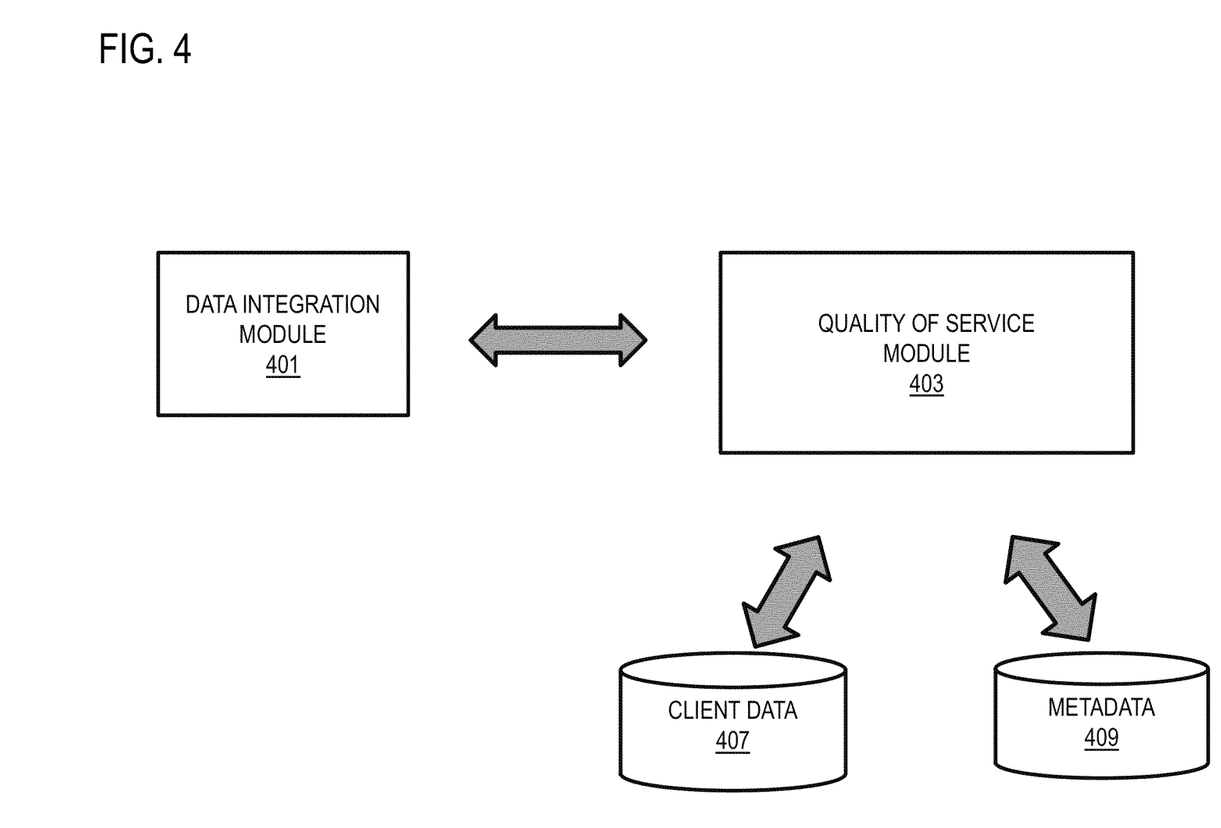
FIG. 4 is a block diagram of a quality of service data flow, according to an embodiment.

FIG. 4 is a block diagram of a quality of service data flow, according to an embodiment. The data integration module 401 can be similar to the data integration module 211 of FIG. 2. The quality of service module 403 can be similar to the quality of service module 209 of FIG. 2. The client data 407 and the metadata 409 can be parts of or included in a data store similar to the data store(s) 215. In some instances, the quality of service module 403 calculates a quality-of-service (QoS) value for the data associated with a service provided by a service provider compute device 109. The quality of service module 403 can receive the data from a data integration module 401 and calculate the QoS value based on client data 407 and/or metadata 409.

In some instances, the client data 407 can include various data associated with a client device 101a-101n such as, for example, geo-location data indicating location of the client device 101a-101n, battery life of the client device 101a-101n, a Unique Device Identifier (UDID) of the client device 101a-101n, a priority indicator associated with the client device 101a-101n, etc.

In some instances, the metadata 409 can include, for example, an endpoint availability indicator showing availability of an endpoint interface associated with the service provider compute device 109. The metadata 409 can also include response time for the service provider compute device 109, desired response time for a client device 101a-101n, etc.

For example, the quality of service module 403 can collect data associated with the service such as endpoint availability, response time, etc. from the service provider compute device 109 (not shown in FIG. 4) and add the data to metadata 409. The quality of service module 403 can also receive the client data 407 and/or the metadata 409 to calculate a QoS value. For example, if a response time of a service provider compute device 109 is higher than the desired response time of the client device 101a-101n, the response provided by the service provider compute device 109 to a request from the client device 101a-101n can have a low QoS value, while a response time higher than the desired response time can cause the QoS value to have a higher value.

In some instances, the quality of service module 403 can send the QoS value to the data integration module 401. The data integration module 401 can integrate the data received from the service provider compute device (109) in response to a request, into a response to the request from the client device 101a-101n based on the QoS value, as previously discussed with regards to FIGS. 2 and 3.

Figure 5:
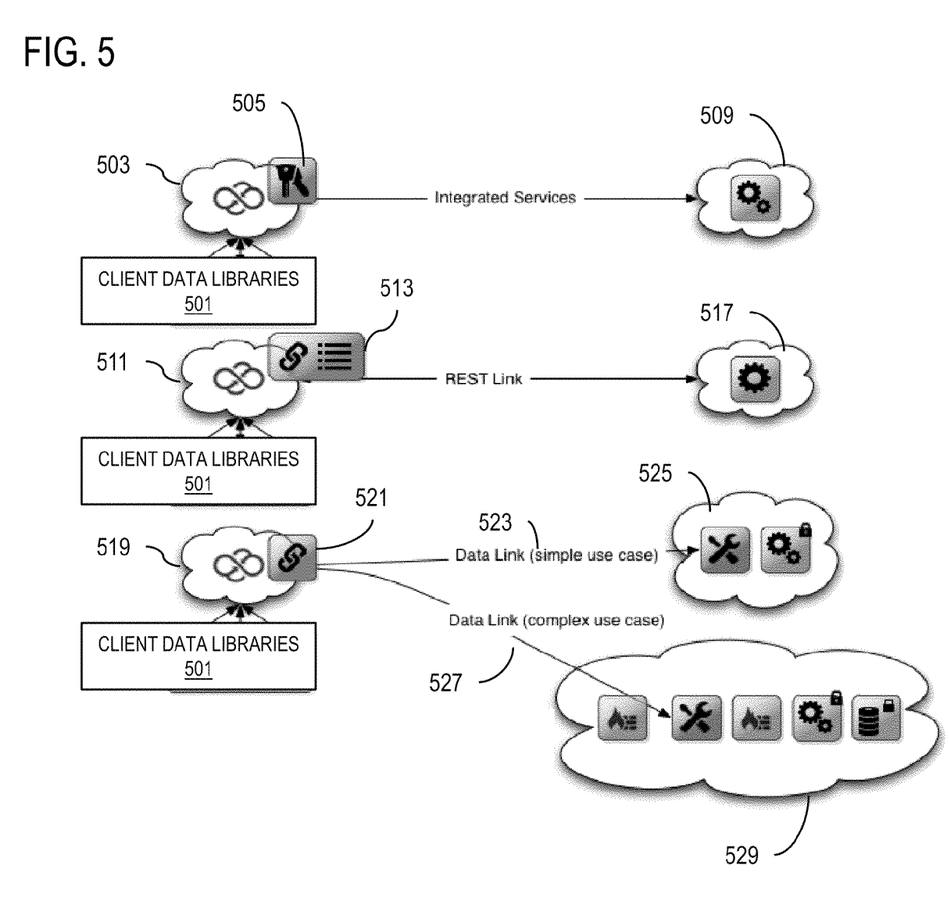
FIG. 5 is a sample illustration of resource management use cases, according to an embodiment.

FIG. 5 is a sample illustration of resource management use cases, according to an embodiment. For example, the resource management platform 200 of FIG. 2 can provide services to a client device 101a-101n of FIG. 1 as shown in FIG. 5. For example, 503, 511, and 519 can be working environments provided by the resource management platform 200 on a client device 101a-101n. A client device 101a-101n has client data libraries 501. The client data libraries 501 can include various standard and/or customized client data libraries 501 related to various services that the client device 101a-101n provides to a user.

In some instances, the resource management platform 200 can provide pre-integrated public services to the client devices 101a-101n. The pre-integrated public services can, for example, include public services such as, for example, Google® Places, Yahoo!® Local, Twitter®, Facebook®, etc. In such instances the resource management platform 200 can enable the client device 101a-101n to request the pre-integrated public service associated with APIs 509 via API 505.

In some instances, the resource management platform 200 can provide Representational State Transfer (REST)-based services to the client devices 101a-101n. In such instances the resource management platform 200 can provide a link and REST rules 513 to the client device 101a-101n. The key and REST rules 513 enable the client device 101a-101n to access REST APIs 517 for various REST services from the resource management platform 200.

In some instances, the resource management platform 200 can provide private services to the client devices 101a-101n. The private services can be, for example, services provided by a service provider compute device 109 of FIG. 1 through a private cloud or services that are behind a firewall. In such instances, the resource management platform 200 can provide a link 521 to the client device 101a-101n. The link 521 enables the client device 101a-101n to request services 525 or 529 via data links 523 and 527, respectively. The resource management platform 200 can, for example, provide a connector code and apply the connector code to a private service to enable the client device 101a-101n to access the private service. The service 527 shows a complex use case including various services provided to a client device 101a-101n such as, for example, firewall protected services, private services, private data (e.g., databases), etc.

Figure 6:
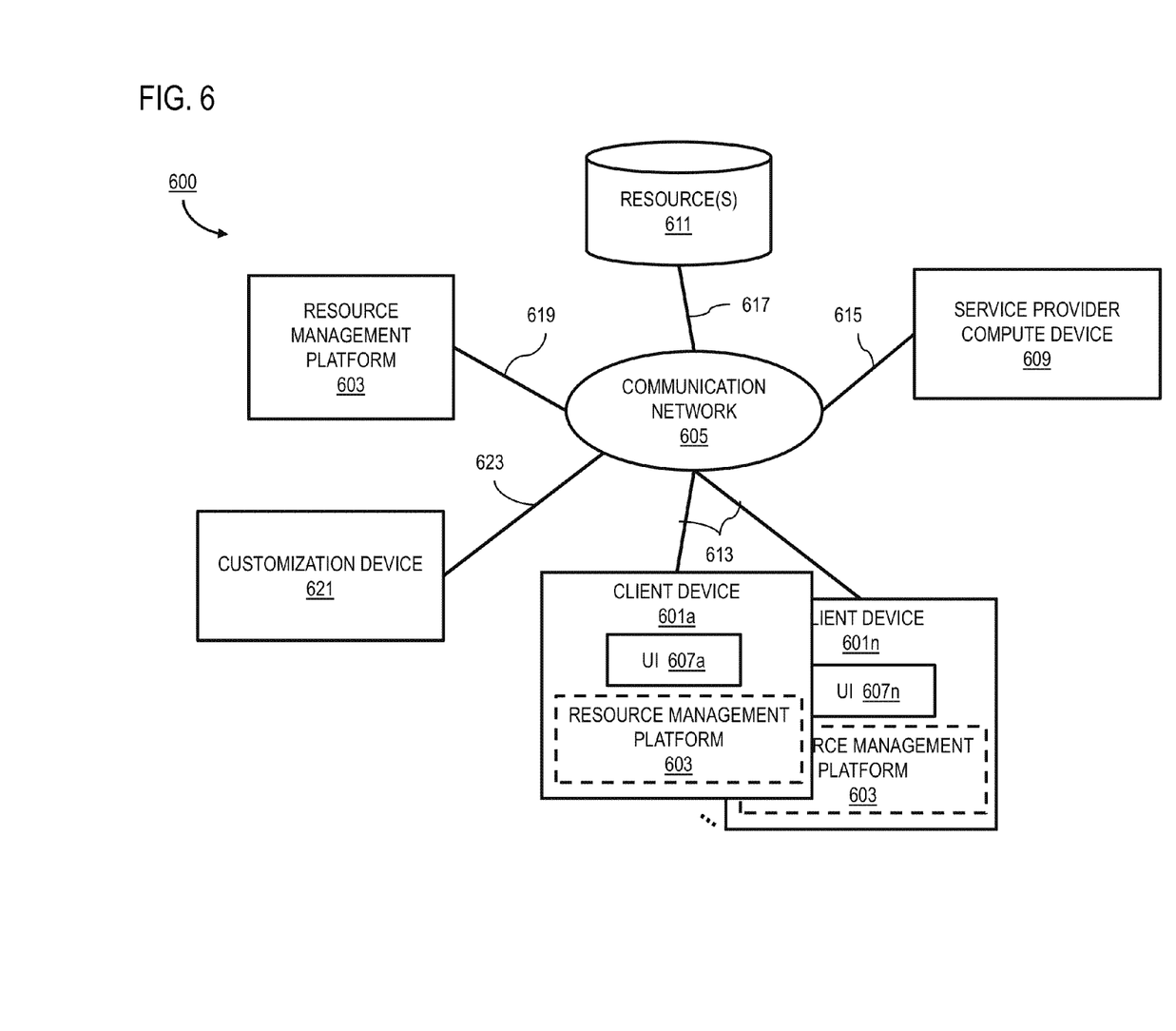
FIG. 6 is a schematic block diagram of a computer system configured to provide resource management with customization capability, according to an embodiment.

FIG. 6 is a schematic block diagram of a computer system configured to provide resource management with customization capability, according to an embodiment. The computer system 600 includes at least one client device 601a-601n (similar to the client device 101a-101n of FIG. 1), having at least a User Interface (UI) 607a-607n (similar to the UI 107a-107n of FIG. 1). The computer system 600 also includes a resource management platform 603, at least one service provider compute device 609 (similar to the service provider compute device 109 of FIG. 1), at least one resource 611, and a customization device 621.

A service provider compute device 609 can be operatively coupled to one or more client devices 601a-601n, one or more resource(s) 611, one or more customization devices 621, and/or other service provider compute devices 609 via a communication network 605 (similar to the communication network 105 of FIG. 1). Note that the resource management platform 603 or some of its components can be embedded within the client device 601a-601n, embedded within a service provider compute device 609, and/or be external to the client device 601a-601n, and the service provider compute device 609. In addition, the resource management platform 603 can be operatively coupled to one or more client devices 601a-601n, one or more service provider compute devices 609, one or more resource 611, or one or more customization devices 621 via a communication network 605. Any of the devices or platforms of the computer system 600 can be equipped with local memory/storage spaces and/or processors (not shown in FIG. 6). Furthermore, the devices and platforms of the computer system 600 can have access to centralized or distributed memory/storage spaces and/or processors (not shown in FIG. 6) through the communication network 605. Thus, FIG. 6 is merely an example illustrating the types of devices and platforms that can be included within a computer system 600.

As illustrated in FIG. 6, the client device 601a-601n is operatively coupled to communication network 605 via network connection(s) 613; service provider compute device 609 is operatively coupled to communication network 605 via network connection(s) 615; and the resource management platform 603 is operatively coupled to communication network 605 via network connection(s) 619. Furthermore, resource(s) 611 can be operatively coupled to or accessed via the communication network 605 via network connection(s) 617 and the customization device 621 can be operatively coupled to or accessed via the communication network 605 via network connection(s) 623. Network connections 613, 615, 617, 619, and 623 can be any appropriate network connection for operatively coupling client device 601a-601n, service provider compute device 609, the resource management platform 603, and the customization device 621, respectively. In addition, a resource 611 can be directly coupled to (e.g., not via communication network 605) a client device 601a-601n or to a service provider compute device 609 (direct connection(s) not shown in FIG. 6).

As mentioned above, in some instances, a computer system 600 can include more than one client device 601a-601n, more than one resource management platform 603, more than one service provider compute device 609, and more than one resource 611. A client device 601a-601n, a resource management platform 603, a service provider compute device 609, a resource 611, and/or a customization device 621 can be operatively coupled to the communication network 605 by heterogeneous network connections. For example, a first client device 601a-601n can be operatively coupled to the communication network 605 by a WWAN network connection, another client device 601a-601n can be operatively coupled to the communication network 605 by a DSL network connection, and a resource management platform 603 can be operatively coupled to the communication network 605 by a fiber-optic network connection. The service provider compute device 609 can be, for example, a web server configured to provide various applications to electronic devices, such as client device 601a-601n.

The customization device 621 can be any of a variety of electronic devices that can be operatively coupled to communication network 605. A customization device 621 can be, for example, a personal computer, a tablet computer, a personal digital assistant (PDA), a cellular telephone, a portable/mobile internet device and/or some other electronic communication device. The customization device 621 can include a web browser configured to access a service (e.g., a webpage or website) hosted on or accessible via the service provider compute device 609 over communication network 605. The customization device 621 can be configured to support, for example, HTML using JavaScript. For example, the customization device 621 can include a web browser, such as, Internet Explorer®, Firefox®, Safari®, Dolphin®, Opera® and Chrome®, etc. An Internet page or website can be accessed by a user of a web browser at a customization device 621 by providing the web browser with a reference such as a uniform resource locator (URL), for example, of a webpage.

In some instances, a user of a customization device 621 can access a resource 611 provided by a service provider compute device 609, via a URL designated for the service provider compute device 609. The customization device 621 can access an application provided by the service provider compute device 609 via the URL. A resource 611 can be an application, data associated with the application, etc. stored in a memory location and a service provider compute device 609 can be a web server storing, configuring and providing resource(s) 611 to client devices 601a-601n. For example, the resource(s) 611 can be texts, photos, videos, music, etc. In some instances, a customization device 621 can include specialized software for accessing a service provided by a service provider compute device 609 using a web server other than a browser, such as, for example, a specialized network-enabled application or program. In some instances, portions of a resource 611 accessible via a resource management platform 603 can be located in a local or remote memory space/data store accessible to the resource management platform 603. Such data store can be at least one of a database, a data warehouse, or a file. A customization device 621 can also include a display, monitor or user interface (not shown), a keyboard, various ports (e.g., a USB port), and other user interface components, such as, for example, digital pens, mice, touch screen controls, audio components, and/or video components (each not shown).

In some instances, a customization device 621 can includes a set of client data libraries (not shown in FIG. 6) for various services provided by service provider compute devices 611. The resource management platform 603 can receive requests from a client device 601a-601n and map the request to a service provider compute device 609 by way of a virtual service dispatcher or hosted services based on a nature of the request and service mapping.

In some instances, the customization device 621 can be a service mediation device to access and customize a response to a request before the response is sent to the client device 601a-601n. The customization device 621 can customize the response based on a format associated with the client device 601a-601n.

In various instances, the resource management platform 603 can provide resource management services similar to the services provided by the resource management platform 103. Additionally, the resource management platform 603 enables a customization device 621 to access and customize a request from a client device 601a-601n before providing the requested service to the client device 601a-601n.

Figure 7:
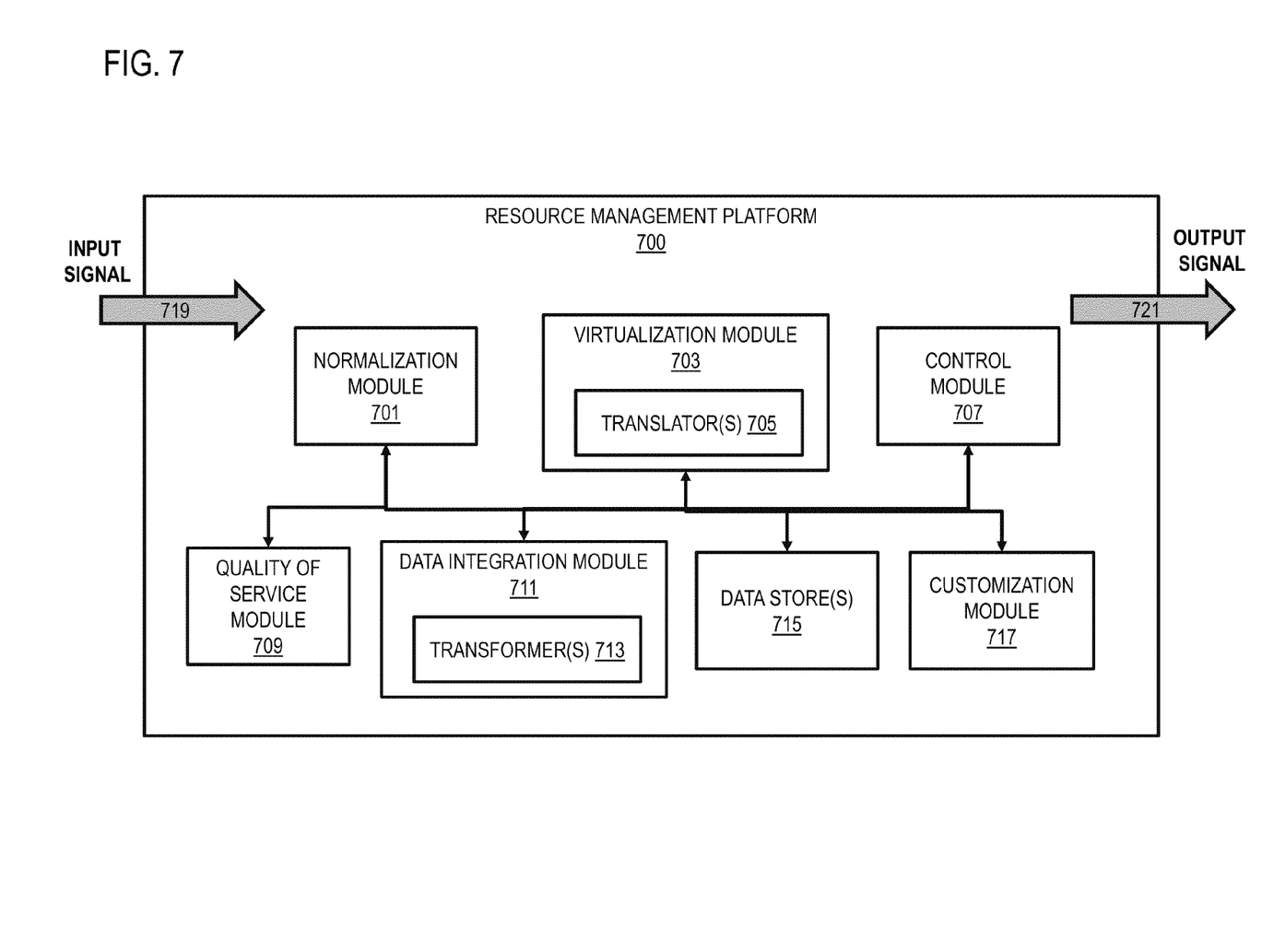
FIG. 7 is a schematic illustration of a resource management platform with customization capability, according to an embodiment.

FIG. 7 is a schematic illustration of a resource management platform with customization capability, according to an embodiment. Resource management platform 700 of FIG. 7 can be similar to the resource management platform 603 of FIG. 6. As shown in FIG. 7, a resource management platform 700 can include a normalization module 701 (similar to the normalization module 201 of FIG. 2), a virtualization module 703 (similar to the virtualization module 203 of FIG. 2), a control module 707 (similar to the control module 207 of FIG. 2), a quality of service module 709 (similar to the quality of service module 209 of FIG. 2), a data integration module 711 (similar to the data integration module 211 of FIG. 2), a data store 715 (similar to the data store 215 of FIG. 2), and a customization module 717. Moreover, the virtualization module 703 can include at least one transformer 705 (similar to the transformer 205 of FIG. 2), and the data integration module 711 can include at least one transformer 713 (similar to the transformer 213 of FIG. 2). Furthermore, the resource management platform 700 can communicate with other components of a computer system (e.g., computer system 600 of FIG. 6) via input signal 719 and output signal 721, which are received and sent respectively through an input port and an output port (not shown in FIG. 7).

In various instances, the resource management platform 700 and its components may be located anywhere within a computer system 600 such as that shown in FIG. 6 including, but not limited to, within the client device 601a-601n, within the service provider compute device 609, or in separate locations within the computer system 600 of FIG. 6.

In various instances, the resource management platform 700 can provide resource management services similar to the services provided by the resource management platform 200. Additionally, resource management platform 700 enables a customization device 621 to access and customize a request from a client device 601a-601n before sending the request to the normalization module 701. The customization device 621 can also customize a response to a request before the response is sent to the client device 601a-601n.

In some instances, the customization device 621 can receive a request from the client device 601a-601n, update the request based on one or more pre-defined customization rules (not shown) and send the customized request to the resource management platform 700. In some other instances, the customization device 621 can send the customization rules to the resource management platform 700. In such instances, the customization rules can be stored in the data store(s) 715. Upon receiving a request from a client device 601a-601n at the resource management platform 700, the customization module 717 can apply the customization rules provided by the customization device 621 to the request before the request is normalized by the normalization module 701.

In some instances, the customization module 717 receives, from a customization device 621, a request-customization code associated with a request from a client device 601a-601n. The customization code can be based on one or more service requirements for the service and/or the request.

In some other instances, the customization module 717 can receive a request for a service from a client device 601a-601n of FIG. 6 and the customization code from a customization device 621 via an input signal 619. The request for service can be a request for a service provided by one or more service provider compute devices 609 of FIG. 6. The customization module 717 can update the request based on the customization code and send the updated request to the normalization module 701.

The process of providing a response to the request was previously discussed with regards to FIG. 2. In some instances, the resource management platform 700 receives a response to the request from the service provider compute device 609 via an input signal 719. In such instances, the quality of service module 709 can evaluate a quality-of-service (QoS) value for the response based on a client data library associated with the client device 601a-601n that initiated the request, based on metadata associated with the client device 601a-601n, based on a user account associated with the client device 601a-601n, based on a client data library and/or account associated with the customization device 621, etc.

In some instances, the control module 707 can define whether the response is being sent to the client device 601a-601n based on the calculated value of the QoS. For example, if the value of QoS is lower than a predefined threshold the control module 707 can prevent the response from being sent to the client device 601a-601n. The control module 707 can send a message to the client device 601a-601n indicating that the response is not satisfactory. The control module 707 can send a signal to the virtualization module 703 to translate the normalized query using a different translator 705 associated with a different service provider compute device 609, for example, based on an instruction from a user of the client device 601a-601n.

In some instances, the customization device 621 can customize the response before the response is sent to the client device 601a-601n. In such instances, the customization module 717 can update the response based on a format associated with the request-customization code received from the customization device 621.

Figure 8:
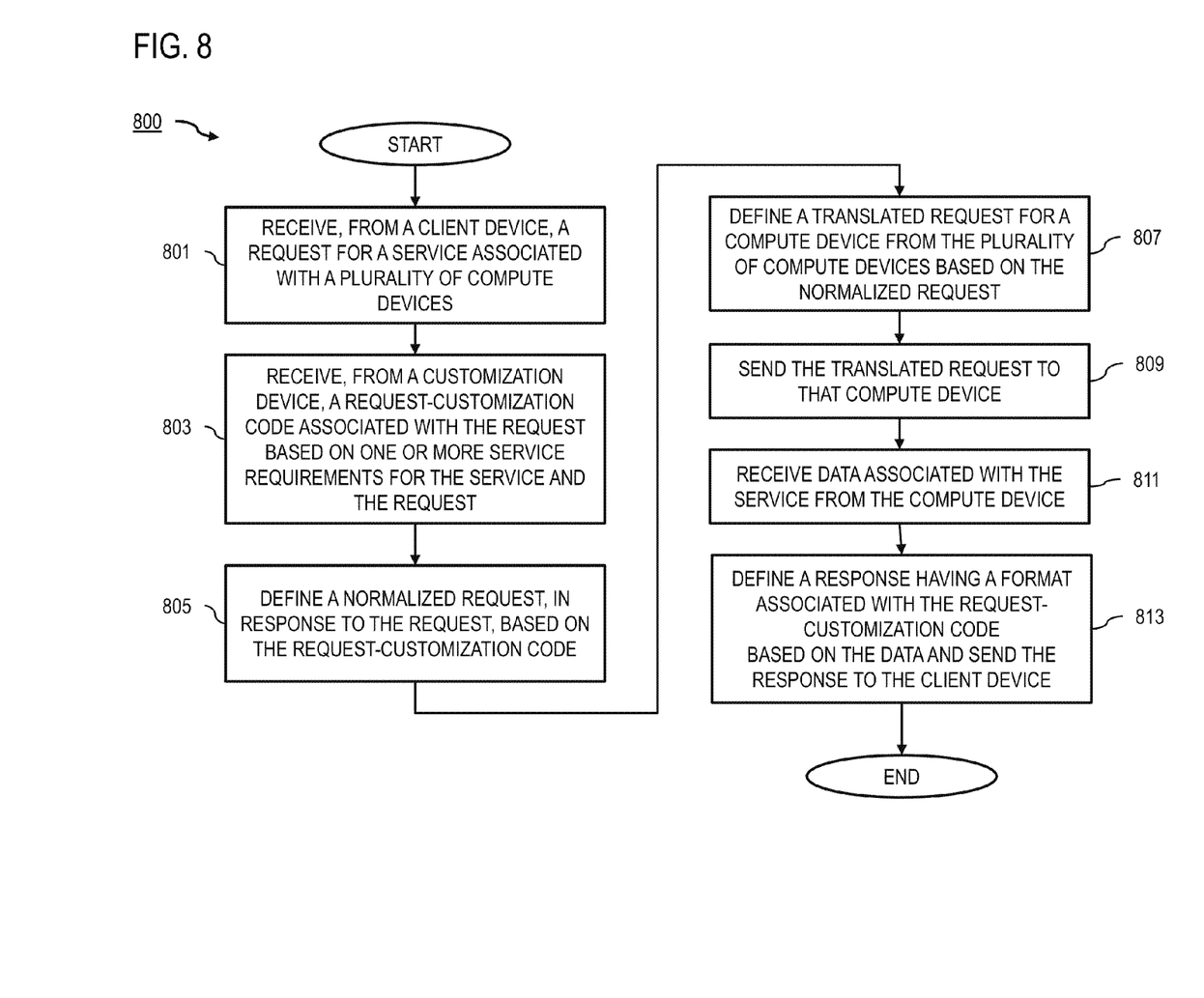
FIG. 8 is a flowchart of a process for providing resource management with customization capability, according to an embodiment.

FIG. 8 is a flowchart of a process for providing resource management with customization capability, according to an embodiment. At 801, a request for a service is received from a client device (e.g., 601a-601n shown in FIG. 6) at a resource management platform (e.g., 700 shown in FIG. 7). The requested service can, for example, be an online accessible service, a legacy enterprise service, etc., provided by one or more service provider compute devices 609 (as shown in FIG. 6).

At 803, a request-customization code associated with the request is received at a customization module (e.g., 717 shown in FIG. 7) from a customization device (e.g., 621 shown in FIG. 6). The customization code can be based on one or more service requirements for the service and the request. The customization module (717) can update the request based on the customization code. The customization module (717) can store the updated request in a data store (715).

At 805, a normalized request is defined, in response to the request, for example, by the normalization module (e.g., 701 shown in FIG. 7). The normalized request can be defined based on a metadata associated with one or more service requirements for the service (as discussed with regards to FIGS. 2 and 3) and the request customization code. At 807, a translated request is defined based on the normalized request, for a service provider compute device from the one or more service provider compute devices (e.g., 609 shown in FIG. 6). The translated request can have a format associated with an endpoint interface for that service provider compute device 609. The translated request can be defined, for example, by a translator 705 from the virtualization module 703. In some instances, the translator 705 can define the translated request through a service mediation layer (not shown). The service mediation layer can be, for example, a device mediating between the resource management platform 603 and the service provider compute device 609. In some instances, the translated request can be defined based on preference data associated with the client device (e.g., 601a-601n shown in FIG. 6). For example, a user of the client device can define preferences associated with the service or the service provider compute devices 609. The preferences can be stored on a local memory on the client device 601a-601n (not shown), on data store(s) 715, or in a separate location throughout the communication network 605.

At 809, the translated request can be sent to the service provider compute device (e.g., 609 shown in FIG. 6) via an output signal (e.g., 721 shown in FIG. 7) from the resource management platform (700). The translated request can be sent to the service provider compute device (609) in accordance with the endpoint interface of the service provider compute device (609) that is associated with the format of the translated request.

At 811, data associated with the service is received from the service provider compute device (609) via the endpoint interface and an input signal (719) at the resource management platform (700), in response to the translated request.

In some instances, the data integration module (e.g., 711 shown in FIG. 7) transforms the received data, for example using a transformer (713), to a format compatible with the client device (601a-601n). At 813, a response to the request is defined by the data integration module (711) based on the data and based on a format associated with the request-customization data provided by the customization module (621).

The response provided by the data integration module 711 can be sent to the client device (601a-601n) by the resource management platform (700). The response can have a format associated with the client device (601a-601n) based on the data and/or based on the request customization-code provided by the customization module (621). In some instances, the data integration module (211) can provide the response based on a client data library of the client device (601a-601n) associated with the service.

It is intended that the methods and apparatus described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein.

What is claimed is:

1. A non-transitory processor-readable medium storing code representing instructions to be executed by a processor, the code comprising code to cause the processor to:

receive, from a client device having a data library, a request for a service associated with a plurality of compute devices, each compute device having an endpoint interface for the service;

define a normalized request, in response to the request, based on a metadata associated with one or more service requirements for the service;

define a translated request for a compute device from the plurality of compute devices based on the normalized request, the translated request (1) having a format associated with the endpoint interface for the compute device, (2) based on preference data associated with the client device;

send the translated request to the compute device in accordance with the endpoint interface associated with the format of the translated request;

receive data associated with the service from the compute device via the endpoint interface, in response to the translated request;

calculate a quality-of-service (QoS) value for the data based on at least one of the request, the data library, the metadata, or a user account associated with the client device;

define a response based on the QoS value such that (1) the response includes the data when the QoS value is not less than a pre-defined threshold, and (2) the response includes a message indicating the data as unsatisfactory when the QoS value is lower than the pre-defined threshold; and send, to the client device, the response having a format associated with the client device based on the data.

2. The non-transitory processor-readable medium of claim 1, wherein the code to define the translated request is provided through a service mediation layer.

3. The non-transitory processor-readable medium of claim 1, wherein the service is at least one of an online accessible service or a legacy enterprise service.

4. The non-transitory processor-readable medium of claim 1 wherein the data library is a first data library, the code further comprising code to cause the processor to:

define the response based on the data and a second data library associated with the client device without reconfiguring or changing the first data library.

5. The non-transitory processor-readable medium of claim 1, wherein the client device is associated with a first network and the compute device is associated with a second network external from the first network.

6. The non-transitory processor-readable medium of claim 1, the code further comprising code to cause the processor to:

define a user priority for each user account from a plurality of user accounts associated with a plurality of client devices based on the QoS value for each client device from the plurality of client devices, the code to send the translated request being based on the user priority for the user account associated with the client device.

7. The non-transitory processor-readable medium of claim 1, wherein the request for the service is at a first time, the normalized request is a first normalized request, the translated request is a first translated request, the response is a first response, the code further comprising code to cause the processor to:

receive, at a second time after the first time, a request for a run-time service associated with the compute device and the data;

define a second normalized request, in response to the request for the run-time service, based on metadata associated with one or more service requirements for the run-time service;

define a second translated request for the compute device based on the second normalized request, the second translated request having a format associated with the endpoint interface for the compute device;

send the second translated request to the compute device in accordance with the endpoint interface associated with the format of the second translated request;

receive run-time data associated with the run-time service from the compute device via the endpoint interface, in response to the second translated request; and send a second response based on the run-time data.

8. The non-transitory processor-readable medium of claim 1, wherein the request is associated with software application development.

9. The non-transitory processor-readable medium of claim 1, wherein the request is from a software development user.

10. An apparatus, comprising:

a normalization module implemented in at least one of a memory or a processing device, the normalization module configured to receive a request for a service from a plurality of services from a client device having a plurality of data libraries, the service from the plurality of services being associated with a compute device having an endpoint interface for the service, the normalization module being configured to receive at least one metadata associated with one or more service requirements for the service, the normalization module configured to define a normalized request in response to the request, based on the metadata;

a virtualization module including a set of translators, each translator from the set of translators being uniquely associated with a service from the plurality of services, the virtualization module configured to define a translated request for the compute device based on the normalized request and a translator from the set of translators, the translated request having a format associated with the endpoint interface for the compute device, the virtualization module configured to send the translated request to the compute device in accordance with the endpoint interface associated with the format of the translated request;

a control module configured to switch automatically between translators from the set of translators, (1) using the metadata based on at least one of a timing of the request or an availability of the service, and (2) based on preference data of a user of the client device; and a data module configured to receive data associated with the service from the compute device via the endpoint interface, the data module configured to calculate a quality of service value for the data based on at least one of the request, a data library from a plurality of data libraries of the client device, the metadata, or a user account associated with the client device, the data module configured to define a translated response having a format associated with the client device based on the data and a data library from the plurality of data libraries of the client device, the data module configured to send the translated response to the client device.

11. The apparatus of claim 10, wherein the control module is configured to switch between translators from the set of translators without reconfiguring or changing the plurality of data libraries.

12. The apparatus of claim 10, further comprising a web-based administrative interface configured to receive configuration data associated with a new translator, the set of translators defined to include the new translator.

13. The apparatus of claim 10, further comprising:

a web-based administrative interface configured to receive configuration data associated with a new translator, the set of translators defined to include the new translator; and a code generator responsive to the configuration data to generate the new translator.

14. The apparatus of claim 10, wherein the virtualization module provides access to the client device, to at least one of a REST-based application service, a file storage service, a push notification service, a geo-location service, a mobile analytic service, a user management service, a data-level privacy service, or a security access control service.

15. The apparatus of claim 10, wherein the data module includes at least one transformer associated with the client device, the data module configured to define the translated response in accordance with the at least one transformer.

16. A non-transitory processor-readable medium storing code representing instructions to be executed by a processor, the code comprising code to cause the processor to:

receive, from a client device having a data library, a request for a service from a plurality of services and associated with a plurality of compute devices, each compute device from the plurality of compute devices having an endpoint interface for the service;

receive, from a customization device, a request-customization code associated with the request based on one or more service requirements for the service and the request;

define a normalized request, in response to the request, based on the request-customization code;

select, a translator from a set of translators, based on at least one of a timing of the request or an availability of the service, each translator from the set of translators being uniquely associated with a service from the plurality of services;

define a translated request for a compute device from the plurality of compute devices based on (1) the normalized request, (2) preference data associated with the client device, and (3) the selected translator from the set of translators, the translated request having a format associated with the endpoint interface for that compute device;

send the translated request to the compute device in accordance with the endpoint interface associated with the format of the translated request;

receive data associated with the service from the compute device via the endpoint interface, in response to the translated request;

calculate a quality-of-service (QoS) value for the data based on at least one of the request, the data library, metadata associated with one or more service requirements for the service, or a user account associated with the client device;

define a response having a format associated with the request-customization code based on the data; and send, to the client device, the response having the format associated with the request-customization code based on the data.

17. The non-transitory processor-readable medium of claim 16, wherein the customization device is a service mediation device to customize the response based on a format associated with the client device.

18. The non-transitory processor-readable medium of claim 16, wherein the client device is associated with a first network and at least one compute device from the plurality of compute devices is associated with a second network external from the first network.

19. The non-transitory processor-readable medium of claim 16, wherein the code to cause the processor to define the response includes code to cause the processor to define the response based on the QoS value such that (1) the response includes the data when the QoS value is not less than a pre-defined threshold and (2) the response includes a message indicating the data as unsatisfactory when the QoS value is lower than the pre-defined threshold.

20. The non-transitory processor-readable medium of claim 19, the code further comprising code to cause the processor to:

define a user priority for each user account from a plurality of user accounts associated with a plurality of client devices, based on the QoS value for each client device from the plurality of client devices, the code to send the normalized request being based on at least one of (1) the user priority for the user account associated with that client device, and (2) a metadata associated with the request.

* * * * *